United States Patent [19]

Fort

[11] Patent Number: 4,590,959
[45] Date of Patent: May 27, 1986

[54] VALVES

[75] Inventor: Edward S. Fort, Clitheroe, England

[73] Assignee: Fort Vale Engineering Limited, Nelson, England

[21] Appl. No.: 477,750

[22] Filed: Mar. 22, 1983

[30] Foreign Application Priority Data

Mar. 23, 1982 [GB] United Kingdom ................. 8208457

[51] Int. Cl.⁴ .......................... F16K 51/00; F16G 1/00
[52] U.S. Cl. ...................................... 137/315; 403/348
[58] Field of Search ........................... 137/315, 329.04; 403/348; 248/222.3

[56] References Cited

U.S. PATENT DOCUMENTS

| 2,715 | 7/1842 | Fowler | 248/222.3 |
| 2,697,581 | 12/1954 | Ray | 403/348 |
| 2,935,995 | 5/1960 | Rucker | 137/329.04 |

FOREIGN PATENT DOCUMENTS 75728 3/1919 Austria .............................. 403/348

*Primary Examiner*—William E. Lyddane
*Assistant Examiner*—Gerald A. Anderson
*Attorney, Agent, or Firm*—Gipple & Hale

[57] ABSTRACT

A valve assembly comprising a movable valve member which is urged resiliently toward a valve seat and which is actuated by a connecting rod.

In order to ensure that the connecting rod does not become accidentally disengaged from the movable valve member, but is nevertheless releasable therefrom, the connecting rod is arranged to be received in a pocket in the movable valve member, which pocket is closed by a slotted plate. The slot allows the end of the connecting rod to be inserted into the pocket in one relative angular position while preventing it from being removed when in any other angular position.

The end of the connecting rod is T-shaped and is rotated 90° after being passed through the slot. The pocket has a groove which receives the head of the T-shaped end to prevent relative rotation of the valve member in use. The connecting rod is operated by way of a crank which goes over center when the valve is fully open.

3 Claims, 10 Drawing Figures

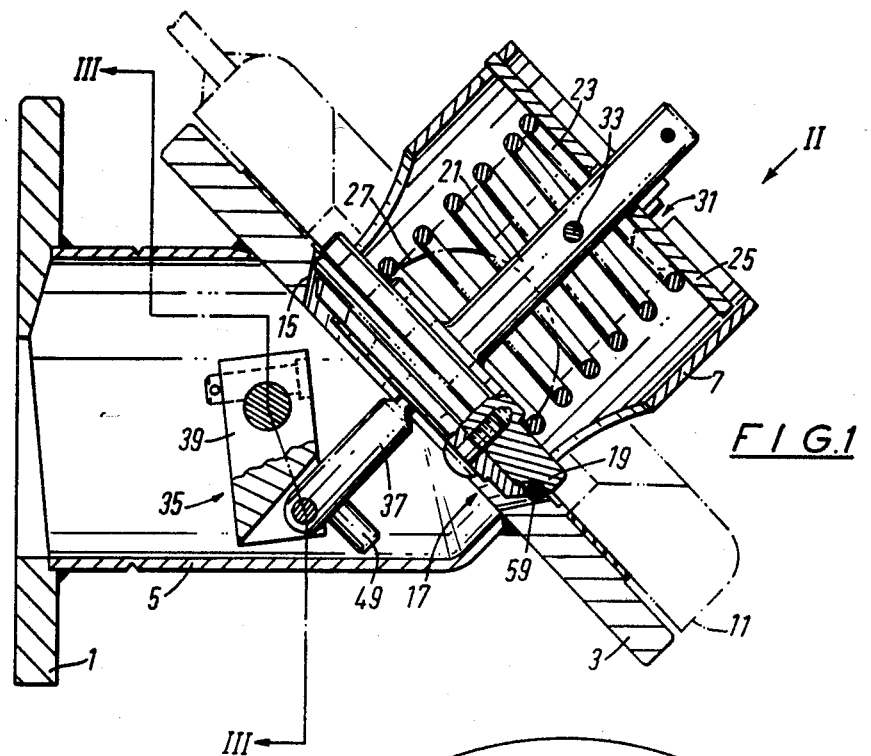
FIG.1
FIG.2
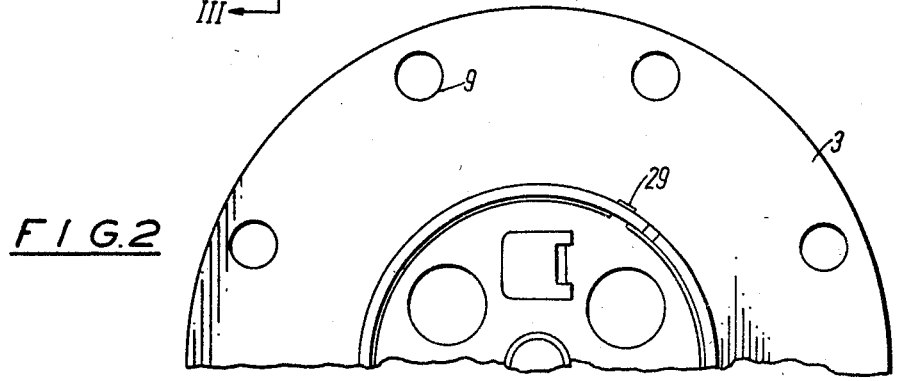
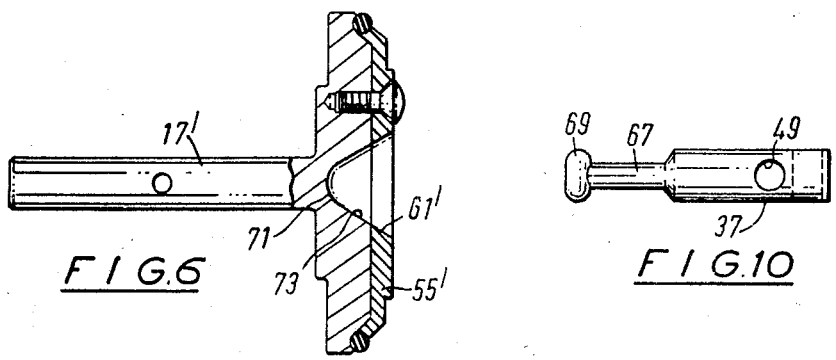
FIG.6
FIG.10

VALVES

DESCRIPTION

The present invention relates to valves and in particular to a valve assembly operating mechanism.

The valve has particular application as a closure for the discharge orifice of tanks and the like containers and is especially useful for tanks carrying or containing cargoes which have a tendency to congeal. One known type of discharge orifice closure valve comprises a mushroom or poppet valve which is disposed within the tank and which is subject to the action of a spring to bias it into engagement with a valve seat. The pressure of the cargo in the container also acts on the valve in a closing direction. A push rod, having a rounded end, cooperates with a dome shaped recess in the poppet valve and is movable by a lever to displace the valve in an opening direction. The valve operating mechanism may employ an over centre device so that the valve is held in the open position, with the lever released, whilst the cargo discharges. When the cargo has a high viscosity or has a tendency to congeal problems can be experienced in closing the valve. For example the lever may be operated to move the push rod into its closed position, but the valve may stick in the open position. Even if the valve only sticks momentarily this may be long enough for the push rod to become disengaged from the recesses. As well as preventing subsequent operation of the valve this can lead to damage of the valve seat.

It is an aim of the present invention to provide an improved valve assembly which overcomes these problems.

According to the present invention there is provided a valve assembly comprising a movable valve member which is urged resiliently toward a valve seat, and a valve operating mechanism comprising a connecting rod, one end of which is received in a pocket in the movable valve member and is engageable releasably therein by relative rotation between the connecting rod and the movable valve member, the connecting rod cooperating with the movable valve member to displace the movable valve member at least in a direction to open the valve.

Preferably the pocket is defined by by a blind recess in the valve member and a slotted closure plate extending across the open end of the recess.

The said one end of the connecting rod is preferably T-shaped, the head of the T being dimensioned to pass through the slot in the closure plate permitting assembly and disassembly of the two parts when the head of the T is aligned with the slot, and preventing disengagement of the two parts when the slot in the valve is rotated relative to the head of the T. Preferably the components are rotated 90° relative to one another, and a groove, dimensioned to receive the head of the T, is formed in the blind end of the pocket at an angle of 90° to the slot. The head of the T sits in this groove when cooperating with the valve member during opening of the valve. The recesses has a conical or part spherical surface leading to the groove and the loading on the valve member ensures that any tendency for the valve member to rotate in use, relative to the connecting rod is counteracted.

In one embodiment the connecting rod is pivotally attached to a crank which is in turn journalled for rotation in the valve housing. When the valve is fully open the crank goes over centre holding the valve in the open position against the force of a valve spring which acts between the movable valve member and an abutment plate. The valve spring and abutment plate are accommodated within a cage which is secured to the valve housing.

By virtue of the interlocking engagement of the connecting rod in the pocket of the valve member, the connecting rod can also act on the valve in a direction to close the valve. Thus the present invention has the advantage that the connecting rod cannot become accidentally disengaged from the valve member and this in turn prevents the possibility of damage to the valve seat by the connecting rod.

The present invention will now be described further, by way of example only, with reference to the accompanying drawings; in which:

FIG. 1 is a sectional view of a valve assembly in accordance with the invention, FIG. 2 is a half elevational view of FIG. 1 looking in the direction of the arrow II.

FIG. 6 is a modified poppet valve,

FIG. 10 is a view of the connecting rod showing the T-shaped end.

Figure 3:
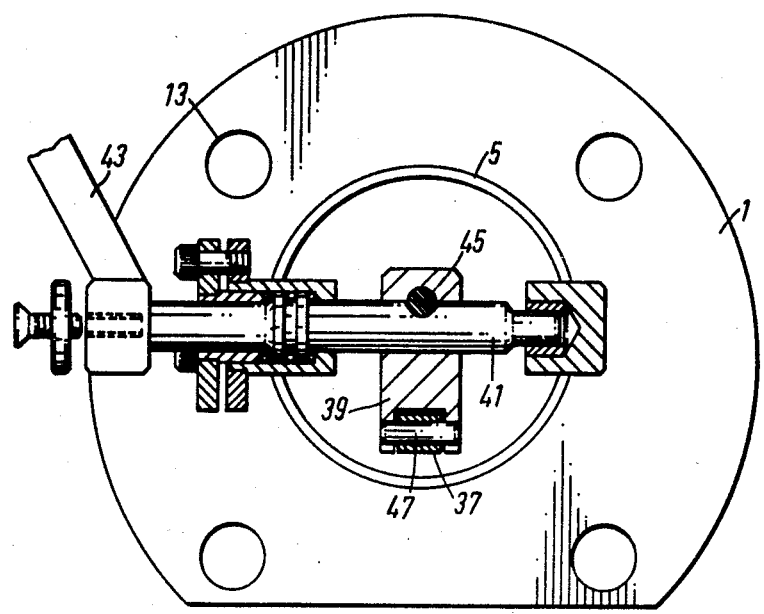
FIG. 3 is a section on the line III—III of FIG. 1.

Referring more particularly to FIGS. 1, 2 and 3 there is illustrated a valve assembly for use as a discharge valve closure for a tank or like container. The valve incorporates the features of the present invention which features will become apparent from the description of FIGS. 4 to 10 described further hereinafter. The valve assembly has a housing which includes a pair of flanges 1, 3, a body 5 interconnecting the flanges and a cage 7 secured to the flange 3. The flange 3 has a plurality of circumferentially spaced bores 9 disposed adjacent the periphery by means of which the valve housing may be secured to a flanged orifice 11 of the tank or container shown in outline only. The flange 1 is provided with bores 13 for attaching an appropriate discharge pipe or other connection. The flange 3 has a tapered valve seat 15 with which the sealing face of a movable valve member 17 cooperates. The valve member 17 takes the form of a poppet or pressure plate valve and is commonly referred to in the art as a mushroom. The valve member 17 has a disc shaped head 19 and an axially projecting stem 21. Conveniently this is friction welded into the head. A spring 23 acts between the head of the valve member and an abutment plate 25 which abutment plate cooperates with the cage 7. The cage 7 has apertures 27 through which the cargo flows during discharge when the valve member is raised from its seat. The abutment plate 25 has radially outwardly projecting lugs 29 and the cage has U-shaped cut-outs 31 in its rim. The lugs 29 and cut-outs 31 form a bayonet mount whereby the abutment plate is interlocked with the cage by first aligning the lugs with the open end of the cut-out, displacing the abutment plate axially toward the valve seat and then rotating it in a clockwise direction as drawn. In practice the valve member, spring and abutment plate are assembled as a unit. With the spring in position it is compressed until a hole 33 in the valve seat 21 projects beyond the abutment plate 25. A pin, not shown, is inserted into the hole 33 to hold the abutment plate in this position with the spring compressed. The unit may then be assembled into the cage as described above. It is important that the valve stem is aligned with respect to the abutment plate. The reason for this will become clear by reference to the following description.

A valve operating mechanism, generally indicated by reference numeral 35, comprises a connecting rod 37, a crank 39, a shaft 41 and an operating lever 43. The shaft 41 is journalled in bearings located in the connecting body 5. The lever 43 is keyed or otherwise secured to the shaft 41 and serves to rotate it. The crank 39 is fixedly connected to shaft 41 by a pin 45 and the connecting rod 37 is secured pivotally to the crank by way of a pin 47. The connecting rod 37 is provided with a stop pin 49. The connecting rod 37 cooperates with the movable valve member for positive opening of the valve and is engageable releasably with the valve member. The releasable connection is described further hereinbefore with reference to FIGS. 4 to 10. The valve may be operated remotely by way of a rod or cable which cooperates directly or indirectly with the connecting rod.

Figure 4:
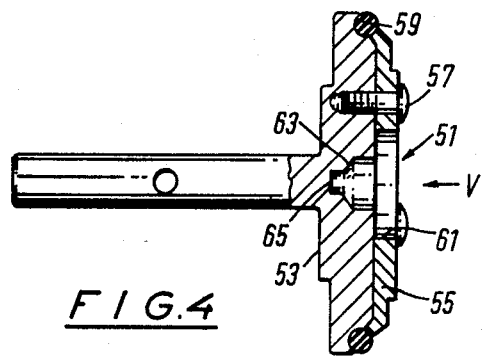
FIG. 4 is a partially sectioned elevation of the poppet valve member of FIG. 1.
Figure 5:
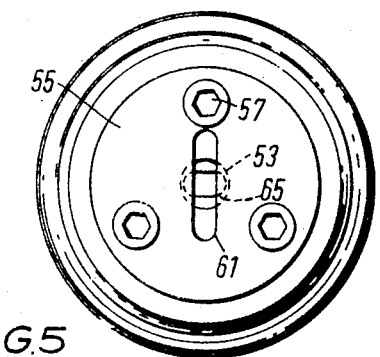
FIG. 5 is an end view of FIG. 4 looking in the direction of the arrow V.
Figure 7:
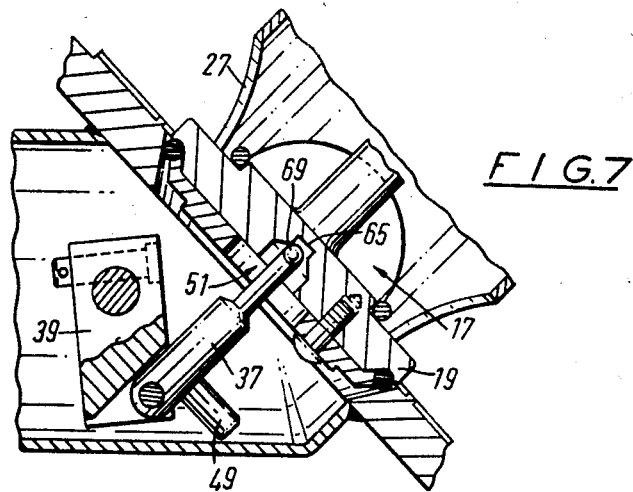
FIG. 7 is a fragmentary sectional view corresponding to that of FIG. 1 showing the valve in the normally closed position.
Figure 8:
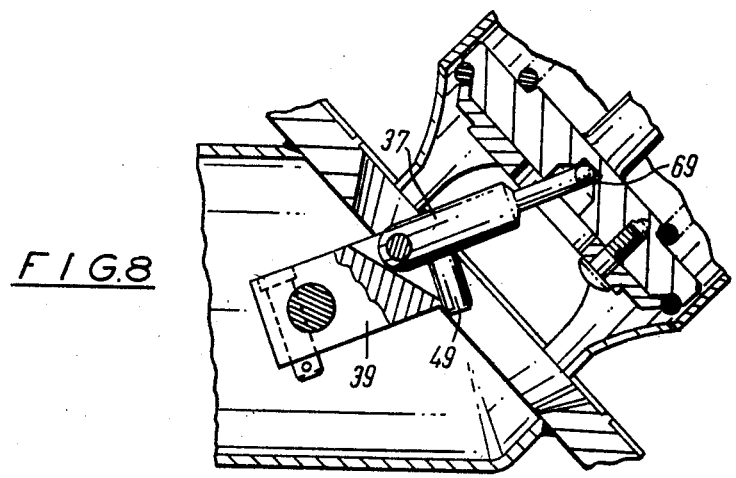
FIG. 8 is a section corresponding to FIG. 7 showing the valve in the normally open position.
Figure 9:
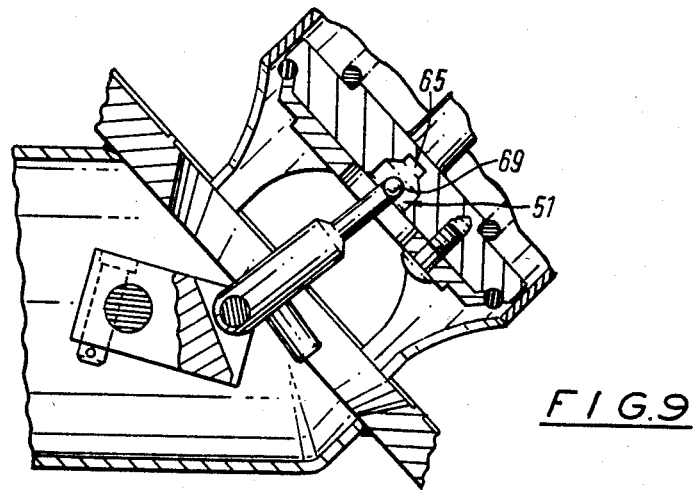
FIG. 9 is a section corresponding to FIG. 7, illustrating how the valve may be closed by the connecting rod.

FIGS. 7, 8 and 9 show the valve member in cross section and illustrate the way in which the connecting rod cooperates with the valve member. The valve member 17 has a pocket 51 which, as illustrated more clearly in FIGS. 4 and 5, is defined by a cylindrical blind bore 53 in the valve member and a closure plate 55. The closure plate 55 is secured to the valve member by set screws 57 and in the illustrated embodiments the closure plate also serves as a retaining plate for a seal ring 59. This dual function avoids introducing additional components. The closure plate 55 has therein an elongate recess 61. The blind end of the bore 53 has a conical portion 63 which tapers towards a groove 65. In an alternative construction, not illustrated, the pocket 51 may be closed by a separate plate containing the elongate recess 61 which is retained in position by an annular plate serving as a retaining ring for the sealing ring 59.

Referring now to FIG. 10, it will be seen that connecting rod 37 is reduced in diameter at one end and said end has a bar 69 extending transversely to the reduced diameter portion 67 and defines a T-shaped end. The diameter of the portion 67 is slightly less than the width of the elongate slot 61 in the closure plate and will pass through the slot as will the head of the T-shaped end when aligned with the slot 61. However, the length of the head of the T is greater than the width of the slot 61 so that when the head is rotated relative to the slot in the closure plate so as to be out of alignment it will not pass through the slot. Clearly if the two parts are relatively rotated after insertion they will be coupled together. The groove 65 in the valve member corresponds in shape to the T-shaped head of the connecting rod 37. FIG. 6 shows an alternative valve member 17' with a different shaped pocket having a spherical end 71 and conical side walls 73. The ends of the slot 61 in the closure plate 55' are tapered in this embodiment. A groove 65 is not illustrated, but this may be provided.

Assembly of the valve member 17, spring 23 and abutment plate 25 as a unit has been described above without reference to any cooperating engagement between the connecting rod and the movable valve member. Such cooperating engagement is achieved by arranging for the slot 61 in the closure plate 55 of the movable valve member to be aligned with the longitudinal axis of the head 69 of the T-shaped end of the connecting rod. It will be seen that the distance between the hole 33 and the entrance to the pocket 51 is such that when the abutment plate is located on the cage by way of the bayonet mount, with the pin in position and the spring 23 compressed, the head of the valve is located at a position in between the closed and open positions illustrated respectively in FIGS. 7 and 8. Thus, the T-shaped end of the connecting rod can be moved toward the valve head and by way of the apertures 27 the T-shaped head can be positioned centrally so that it passes through the aligned slot 61. The movable valve member may then be rotated through up to 90° to complete the interlocking procedure. The lever 43 may be further operated to raise the valve towards its fully open position whereupon the stem 21 of the valve moves upwardly away from the abutment plate so allowing the pin to be removed from the hole 33 whereafter upon release of the lever the valve is returned to its closed position under the influence of the spring 23. Variations on the alignment procedure are possible. For example, the connecting rod can be first moved into a position corresponding to the fully open position of the valve, and the valve member, spring and abutment as a unit offered up so that the end of the connecting rod enters the pocket, and then rotated so that the connecting rod cannot disengage. The lugs of the abutment plate are then aligned with the bayonet openings 31 whilst at the same time moving the valve operating mechanism from its fully open over centre position. The bayonet connection is then completed. The valve is preferably aligned with respect to the abutment plate 25 so that the total angle of rotation between alignment of the slot and T-bar and the fully locked position of the bayonet is 90°.

FIG. 7 shows the at rest position with the valve closed. The T-shaped end 6a of the connecting rod is loosely received in the pocket 51. On movement of the valve operating mechanism the T-shaped head 69 engages in the groove 65 in the valve member and the valve is moved against the spring force to open the valve. FIG. 8 shows the fully open position with the mechanism over centre and the stop pin 49 abutting the crank 39. FIG. 9 illustrates how the T-shaped end 69 of the connecting rod 37 contacts the closure plate 55 when the valve operating mechanism is moved in a closing direction and the valve member 17 sticks in its open position. Further movement of the valve operating mechanism in a closing direction will cause the valve member 17 to be moved in a closing direction toward the valve seat. Having overcome the initial resistance to movement the spring will bias the valve in the closing direction. Thus the arrangement prevents the connecting rod 37 from disengaging with the valve member 17.

Whilst the valve operating mechanism has been described as incorporating an over centre device, this is not essential and may be omitted in alternative constructions.

I claim:

1. A valve assembly comprising a movable valve member, a valve seat towards which the movable valve member is urged resiliently, a valve operating mechanism comprising a connecting rod, a pocket in the movable valve member defined by a blind recess in the valve member, and a closure plate extending across the open end of the blind recess, said closure plate defining a throughgoing elongated recess, said pocket having a groove in the closed end thereof which is dimensioned to receive one end of the connecting rod to resist rotation of the movable valve member, said groove being disposed at 90° C. to said elongated recess in the closure plate, said one end of the connecting rod being engagable releasably within the pocket by relative rotation between the connecting rod and the movable valve member, the connecting rod co-operating with the movable valve member to displace the movable valve member at least in a direction to open the valve.

2. A valve assembly according to claim 1, in which said one end of the connecting rod is T-shaped and the head of the T-shaped end is dimensioned to pass through the elongated in the closure plate.

3. A valve assembly comprising a movable valve member, a valve seat toward which the movable valve member is resiliently biased, a valve operating mechanism comprising a connecting rod, a pocket in the movable valve member within which is received one end of the connecting rod, a T-shaped head for said one end of the connecting rod and a groove in the base of the pocket adapted to receive said T-shaped head, and a closure plate secured across the open end of said pocket and an elongated recess in the closure plate through which the T-shaped head can pass so as to be engagable releasably within said pocket by relative rotation between the connecting rod and the movable valve member, said groove being disposed at 90° to the elongated recess.

* * * * *